(12) United States Patent
Kim et al.

(10) Patent No.: US 10,408,124 B2
(45) Date of Patent: Sep. 10, 2019

(54) CONTROL METHOD FOR TURBOCHARGER

(71) Applicant: Hyundai Motor Company, Seoul (KR)

(72) Inventors: Yoon Joo Kim, Yongin-si (KR); Seung Kook Han, Seoul (KR); Il Joong Hwang, Yongin-si (KR); Dong Ho Chu, Ansan-si (KR); Jong Il Park, Seoul (KR); Dong Hee Han, Seoul (KR); Hyuk Im, Suwon-si (KR); Hyun Jun Lim, Incheon (KR)

(73) Assignee: Hyundai Motor Company, Seoul (KR)

( * ) Notice: Subject to any disclaimer, the term of this patent is extended or adjusted under 35 U.S.C. 154(b) by 898 days.

(21) Appl. No.: 14/527,060

(22) Filed: Oct. 29, 2014

(65) Prior Publication Data
US 2015/0152777 A1   Jun. 4, 2015

(30) Foreign Application Priority Data

Dec. 3, 2013 (KR) .................. 10-2013-0149532

(51) Int. Cl.
| | |
|---|---|
| F02B 37/18 | (2006.01) |
| F02B 37/16 | (2006.01) |
| F02D 41/00 | (2006.01) |
| F02D 41/06 | (2006.01) |
| F02D 41/10 | (2006.01) |

(52) U.S. Cl.
CPC ............. *F02B 37/18* (2013.01); *F02B 37/16* (2013.01); *F02D 41/0007* (2013.01); *F02D 41/062* (2013.01); *F02D 41/10* (2013.01); F02D 2200/101 (2013.01); F02D 2250/16 (2013.01); F02D 2250/18 (2013.01); Y02T 10/144 (2013.01)

(58) Field of Classification Search
CPC ........ F02B 37/16; F02B 37/18; F02B 37/007; F02B 21/00; F02D 2200/101; F02D 2250/16; F02D 2250/18; F02D 41/0007; F02D 41/062; F02D 41/10; Y02T 10/144
USPC .................................. 60/600, 602; 123/564
See application file for complete search history.

(56) References Cited

U.S. PATENT DOCUMENTS

| | | | |
|---|---|---|---|
| 4,774,812 | A | 10/1988 | Hitomi et al. |
| 4,870,822 | A | 10/1989 | Kamimaru |

(Continued)

FOREIGN PATENT DOCUMENTS

| | | |
|---|---|---|
| CN | 102124194 A | 7/2011 |
| CN | 103080516 A | 5/2013 |

(Continued)

*Primary Examiner* — Mark A Laurenzi
*Assistant Examiner* — Paul Thiede
(74) *Attorney, Agent, or Firm* — Morgan, Lewis & Bockius LLP

(57) ABSTRACT

A control method for a turbocharger system may include controlling opening levels of an intake bypass valve, an exhaust bypass valve, and a throttle valve according to a driving condition of a vehicle by a controller, and executing a series of commands by the controller, including determining whether an engine rpm satisfies a set low/medium speed condition, determining whether an acceleration request condition is satisfied when the engine rpm satisfies the set low/medium speed condition, closing the intake bypass valve, and controlling an opening angle of the exhaust bypass valve according to the acceleration request condition.

9 Claims, 3 Drawing Sheets

(56) References Cited

U.S. PATENT DOCUMENTS

| | | | | |
|---|---|---|---|---|
| 5,186,005 | A * | 2/1993 | Yoshioka | F02B 37/007 60/600 |
| 9,523,309 | B2 * | 12/2016 | Kim | F02B 37/127 |
| 2001/0047778 | A1 | 12/2001 | Aoyama et al. | |
| 2011/0132335 | A1 * | 6/2011 | Pursifull | F02B 21/00 123/564 |

FOREIGN PATENT DOCUMENTS

| | | |
|---|---|---|
| CN | 103233825 A | 8/2013 |
| JP | 2001-073784 A | 3/2001 |
| JP | 2011-080373 A | 4/2011 |
| KR | 10-2002-0054376 A | 7/2002 |

* cited by examiner

CONTROL METHOD FOR TURBOCHARGER

CROSS-REFERENCE TO RELATED APPLICATION

The present application claims priority to Korean Patent Application No. 10-2013-0149532 filed Dec. 3, 2013, the entire contents of which is incorporated herein for all purposes by this reference.

BACKGROUND OF THE INVENTION

Field of the Invention

The present invention relates to a control method for a turbocharger, and more particularly, to a control method for a turbocharger capable of improving low/medium speed performance.

Description of Related Art

A supercharger is a device that forcibly makes outdoor air flow into an engine, a supercharger using an exhaust turbine is called a turbo-charger, and a supercharger which is mechanically driven is called a super-charger.

Since air supercharged by the supercharger is at a high temperature, density decreases, and as a result, the air discharged from the supercharger is cooled by a kind of radiator called an intercooler to be supplied to the engine.

Meanwhile, a research for increasing output torque simultaneously while decreasing fuel consumption in an interval in which the rpm of the engine is medium/low in an engine with the supercharger is in progress and a research for more efficiently controlling the supply of recirculated gas is also in progress together.

An output is improved by 30 to 50% through installation of the supercharger, but a temporal delay occurs until a supercharging effect is shown due to an increase of the rpm by pressing an accelerator.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method for a turbocharger that installs a small-sized turbo charger in an rpm area which is equal to or less than maximum torque of a natural intake engine based on the natural intake engine to maximize generation torque in a low/medium speed area and maintain natural intake type performance in a high speed area.

According to various aspects of the present invention, a control method for a turbocharger system may include controlling opening levels of an intake bypass valve, an exhaust bypass valve, and a throttle valve according to a driving condition of a vehicle by a controller, and executing a series of commands by the controller, further including determining whether an engine rpm satisfies a set low/medium speed condition, determining whether an acceleration request condition is satisfied when the engine rpm satisfies the set low/medium speed condition, closing the intake bypass valve, and controlling an opening angle of the exhaust bypass valve according to the acceleration request condition, in which the turbocharger system may include a first intake line supplying outdoor air to an intake manifold of an engine, a turbocharger having a turbine and a compressor, a second intake line supplying fresh air to the compressor, a third intake line connecting the compressor and the first intake line, a throttle valve installed to control a flow of air supplied from the first intake line and the third intake line, the intake bypass valve installed to control a flow of air that flows in the first intake line, a first exhaust line configured to discharge exhaust gas of an exhaust manifold, a second exhaust line channeling a portion of the exhaust gas discharged from the exhaust manifold to the first exhaust line through the turbine, the exhaust bypass valve installed to control a flow of the exhaust gas discharged from the first exhaust line, and the controller.

When the controller determines that the engine rpm does not satisfy the low/medium speed condition, the controller may control the exhaust bypass valve and the intake bypass valve to be opened.

When a current engine rpm is smaller than a maximum turbocharger operated engine rpm, the set low/medium speed condition may be satisfied.

It may be determined whether the acceleration request condition is satisfied from a vehicle operating condition including a request air volume, request torque, and request boost pressure.

The request air volume is an air volume requested by the engine, which is calculated from a current accelerator opening angle and when the requested air volume is larger than an actual air volume supplied to the engine at present, the acceleration request condition may be satisfied.

The request torque may be request torque calculated from the current accelerator opening angle, and when the request torque is larger than a set maximum natural intake engine torque of the engine, the acceleration request condition may be satisfied.

The request boost pressure may be request pressure calculated from the current accelerator opening angle, and when the request torque is larger than a set maximum natural intake boost pressure of the engine, the acceleration request condition may be satisfied.

The opening angle of the exhaust bypass valve may be determined based on the vehicle operating condition including the request air volume, the request torque, and the request boost pressure.

After the controlling of the opening angle of the exhaust bypass valve according to the acceleration request condition, the controller may judge whether a current request torque is smaller than the engine torque and when the current request torque is smaller than the engine torque, the controller may open the exhaust bypass valve and the intake bypass valve.

The controller may determine whether the current request torque is smaller than the engine torque after a set time which is delayed after controlling the opening angle of the exhaust bypass valve.

The control method for a turbocharger system may further include determining whether an ignition key sensor is on by receiving a signal from an ignition key sensor, opening the intake bypass valve and the exhaust bypass valve fully when the ignition key sensor is not on, verifying positions of the intake and exhaust bypass valves by fully closing the intake and exhaust bypass valves and fully opening the intake and exhaust bypass valves thereafter, when the ignition key sensor is on, and starting the engine.

According to various embodiments of the present invention, generated torque may be maximized in a low/medium speed area and performance of a natural intake type may be maintained in a high speed area.

That is, a small-sized turbocharger is used without an electric supercharger which is limited in power based on the natural intake engine and an operating area is extended to maximize acceleration performance and improve fuel efficiency in an actual area.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
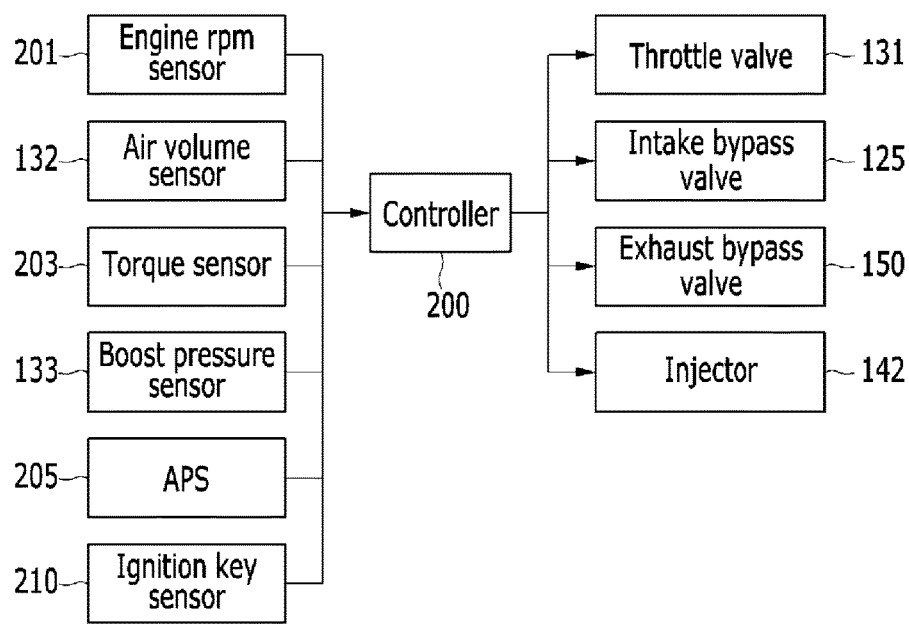
FIG. 1 is a block diagram of a turbo charger system to which an exemplary control method for a turbocharger is applied according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

In the drawings, the thickness of layers, films, panels, regions, etc., are exaggerated for clarity.

When it is described that a certain part such as a layer, a film, a region and a plate is located on another part, it means that the certain part may be located directly on the another part and a third part may be interposed therebetween as well.

In contrast, when an element is referred to as being "directly on" another element, there are no intervening elements present.

Figure 2:
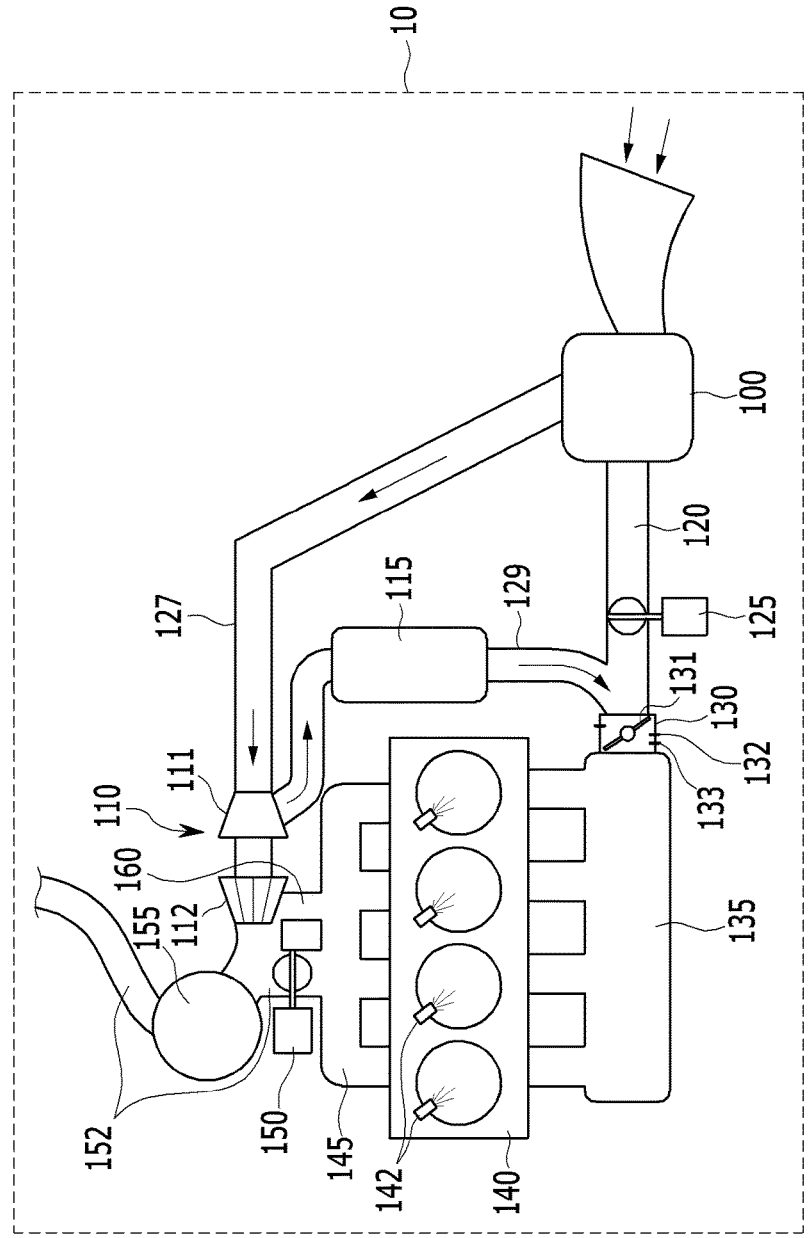
FIG. 2 is a configuration diagram of a turbo charger system to which the exemplary control method for a turbocharger is applied according to the present invention.

FIG. 1 is a block diagram of a turbocharger system to which a control method for a turbocharger is applied according to various embodiments of the present invention, and FIG. 2 is a configuration diagram of a turbocharger system to which the control method for a turbocharger is applied according to various embodiments of the present invention.

Referring to FIGS. 1 and 2, the turbocharger system to which the control method for a turbocharger is applied according to the present invention includes a first intake line 120 supplying outdoor air to an intake manifold 135 of an engine 140, a turbocharger 110 including a turbine 112 and a compressor 111, a second intake line 127 supplying fresh air to the compressor 111, a third intake line 129 connecting the compressor 111 and the first intake line 120, a throttle valve installed to control a flow of air supplied from the first intake line 120 and the third intake line 129, an intake bypass valve 125 installed to control a flow of air that flows in the first intake line 120, a first exhaust line 152 configured to discharge exhaust gas of an exhaust manifold 145, a second exhaust line 160 provided to make some of the exhaust gas discharged from the exhaust manifold 145 join the first exhaust line 152 through the turbine 112, an exhaust bypass valve 150 installed to control a flow of the exhaust gas discharged from the first exhaust line 152, and a controller 200 controlling opening levels of the intake bypass valve 125, the exhaust bypass valve 150, and the throttle valve 131 according to a driving condition of a vehicle 10.

Herein, air that flows into the first intake line 120 and the second intake line 127 is purified through the air-cleaner box 100 and the intercooler 115 may be provided on the third intake line 129 in order to cool air that passes through the compressor 111.

The throttle valve 131 may be provided in a throttle body 130 and an air volume sensor 132 and a boost pressure sensor 133 are provided in the throttle body to apply respectively measured corresponding signals to the controller 200.

A postprocessor including a catalyst 155 is provided on the first exhaust line 152 to reduce harmful ingredients of the exhaust gas.

An engine rpm sensor 201 is provided in the engine 140 to detect an engine rpm and apply the corresponding signal to the controller 200 and the air volume sensor 132 measures an air volume that flows into the intake manifold 135 to apply the corresponding signal to the controller 200 and a torque sensor 103 measures torque of the engine 140 to apply the corresponding signal to the controller 200, the boost pressure sensor 133 detects boost pressure to apply the corresponding signal to the controller 200, and an accelerator opening level sensor (APS) 205 is provided in an acceleration pedal to detect an opening angle of the acceleration pedal and apply the corresponding signal to the controller 200.

The controller 200 receives signals of the respective sensors to control respective opening angles of the throttle valve 131, the intake bypass valve 125, and the exhaust bypass valve 150 and controls an operation of an injector 152 provided in the engine.

Figure 3:
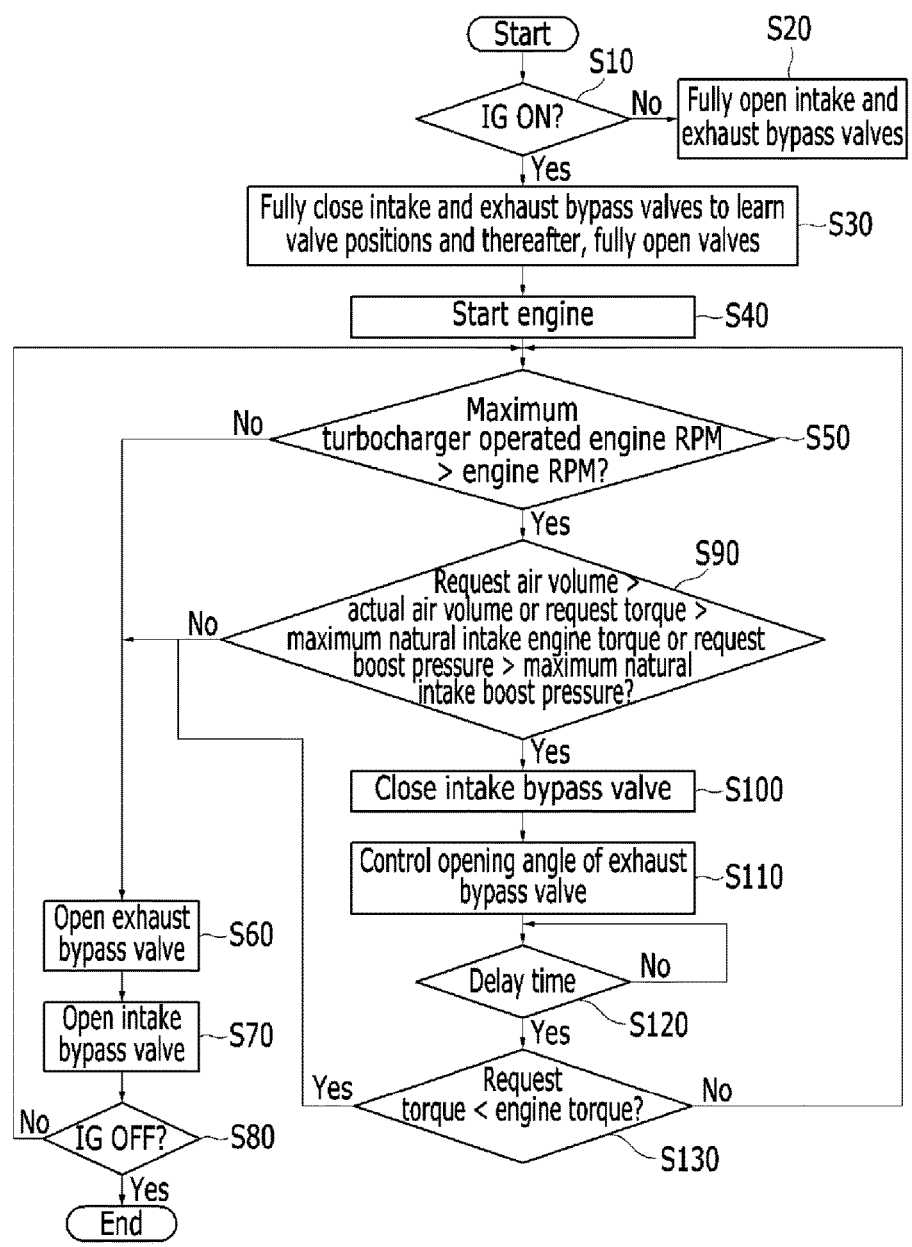
FIG. 3 is a flowchart of the exemplary control method for a turbocharger according to the present invention.

FIG. 3 is a flowchart of a control method for a turbocharger according to an embodiment of the present invention.

Hereinafter, the exemplary control method for a turbocharger according to present invention will be described with reference to FIGS. 1 to 3.

The controller 200 receives the corresponding signal from an ignition key sensor 210 to judge whether the ignition key sensor 210 is on (S10), and when the ignition key 210 is not on, the controller 200 fully opens the intake and exhaust bypass valves 125 and 150 (S20) and when the ignition key 210 is on, the controller 200 fully closes the intake and exhaust bypass valves 125 and 150 to learn valve positions and thereafter, fully opens the valves again (S30).

That is, before starting the engine 140, the controller 200 fully closes the intake and exhaust bypass valves 125 and 150 to verify the positions of the intake and exhaust bypass valves 125 and 150 and thereafter, fully open the intake and exhaust bypass valves.

The controller 200 judges whether the rpm of the engine 140 satisfies a set low/medium speed condition, after the engine 140 is started on (S40) (S50), and when the rpm of the engine 140 satisfies the low/medium speed condition, the controller 200 judges whether to satisfy an acceleration request condition (S90) and when the rpm of the engine 140 does not satisfy the low/medium condition, that is, under a high-speed driving condition, the controller 200 opens the exhaust bypass valve 150 and the intake bypass valve 125 (S60 and S70).

The low/medium speed condition may be satisfied when the current rpm of the engine 140 is smaller than the maximum turbocharger operated engine rpm 110.

Herein, the maximum turbocharger operated engine rpm 110 may be arbitrarily determined through a test as RPM equal to or less than the maximum natural intake torque, for example, approximately 45000 RPM.

The turbocharger 110 uses a small-sized turbocharger in which an air flow coefficient is equal to or less than 2 to maximize performance in a low speed area and efficiently use exhaust energy and the maximum turbocharger operated engine rpm 110 is a value determined through a test as an RPM to ensure the efficient operation of the turbocharger 110.

That is, the control method for a turbocharger according to the present invention uses a small-sized turbocharger under the low/medium speed condition of approximately 45000 RPM or less to extend an operating area and allows the small-sized turbocharger to operate with the natural intake engine under a speed condition of 45000 RPM or more, thereby minimizing exhaust resistance.

It may be determined whether the acceleration request condition is satisfied from a vehicle operating condition including a requested air volume, requested torque, and requested boost pressure.

That is, the requested air volume is an air volume requested by the engine, which is calculated from the current accelerator opening angle and when the calculated requested air volume is larger than an actual air volume supplied to the engine 140 at present, the acceleration request condition may be satisfied.

The actual air volume is an air volume measured by the air volume sensor 132 and since calculation of the requested air volume is apparent to those skilled in the art, a detailed description thereof will be omitted.

The request torque is request torque calculated from the current accelerator opening angle and when the calculated request torque is larger than the set maximum natural intake engine torque of the engine, the acceleration request condition may be satisfied and the maximum natural intake engine torque is a value which is, in advance, set through the test.

Further, since the request torque as a value calculated based on the accelerator opening angle measured by the accelerator opening level sensor 205 is apparent to those skilled in the art, a detailed description thereof will be omitted.

The request boost pressure is a request pressure calculated from the current accelerator opening angle and when the calculated request boost pressure is larger than the set maximum natural intake boost pressure of the engine, the acceleration request condition may be satisfied and the maximum natural intake boost pressure is a value which is, in advance, set through the test.

When the controller 200 judges that the acceleration request condition is satisfied, the controller 200 controls the intake bypass valve 125 to be closed (S100).

In addition, the controller 200 controls an opening angle of the exhaust bypass valve 150 according to the acceleration request condition (S110). Herein, the control of the opening angle of the exhaust bypass valve 150 includes fully closed control.

In the control of the opening angle of the exhaust bypass valve 150, the value determined by the test according to the acceleration request condition is, in advance, input by a map to be used.

That is, the opening angle of the exhaust bypass valve 150 may be determined based on the vehicle operating condition including the request air volume, the request torque, and the request boost pressure, and the opening angle of the exhaust bypass valve 150 is controlled by the map which is, in advance, input through the test.

After the controlling of the opening angle of the exhaust bypass valve 150 according to the acceleration request condition, the controller 200 judges whether the current request torque is smaller than the engine torque and when the request torque is smaller than the engine torque, that is, when a larger output is not requested, the controller 200 may open the exhaust bypass valve 150 (S60) and the intake bypass valve 125 (S70).

The controller 200 judges whether the request torque is smaller than the engine torque within a set time which is delayed after controlling the opening angle of the exhaust bypass valve (S120) to prevent the valve from being frequently controlled.

In the control method for a turbocharger according to various embodiments of the present invention, not under the low/medium speed condition but under a high speed driving condition, both the exhaust bypass valve 150 and the intake bypass valve 125 are opened, and as a result, a natural intake rather than an intake through the turbocharger 110 is used and the engine 140 is operated. Accordingly, performance of a natural intake type in which the exhaust resistance is minimized may be just maintained under the high speed driving condition.

Further, in the control method for a turbocharger according to various embodiments of the present invention, the request torque of the engine may be satisfied by actively using the turbocharger 110 under the low/medium speed condition and in particular, the intake bypass valve 125 is closed and the opening angle of the exhaust bypass valve 150 is controlled or the exhaust bypass valve 150 is closed to actively intake air to the engine 140 by operating the turbocharger 110.

In addition, in the control method for a turbocharger according to various embodiments of the present invention, the exhaust bypass valve 150 and the intake bypass valve 125 are opened under the high speed condition to minimize the exhaust resistance.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for a turbocharger system including an engine and a controller, the method comprising:
executing a series of commands by the controller including:
determining whether a detected revolutions per minutes (rpm) of the engine of the turbocharger system satisfies a set low/medium speed condition of the engine;
determining whether an acceleration request condition of the engine is satisfied after the controller determines that the set low/medium speed condition is satisfied;
selectively closing the intake bypass valve; and
controlling an opening angle of the exhaust bypass valve according to the acceleration request condition after the controller determines that the set low/medium speed condition is satisfied,
wherein the turbocharger system further includes:
an intake manifold fluidically-connected to a first side of the engine;
an exhaust manifold fluidically-connected to a second side of the engine;
a first intake line supplying outdoor air to the intake manifold of the engine, wherein the intake bypass valve is mounted on the first intake line;
a turbocharger including a turbine and a compressor;
a second intake line supplying outdoor air to the compressor;
a third intake line connecting the compressor and the first intake line;
the throttle valve controlling, according to the controller, a flow of air supplied from the first intake line and the third intake line;
the intake bypass valve controlling, according to the controller, a flow of air that flows in the first intake line;
a first exhaust line connected to the exhaust manifold by bypassing the turbocharger and exhausting an exhaust gas of the exhaust manifold;
a second exhaust line channeling a portion of the exhaust gas discharged from the exhaust manifold to the first exhaust line through the turbine; and
the exhaust bypass valve mounted on the first exhaust line and controlling, according to the controller, a flow of the exhaust gas discharged from the first exhaust line,
wherein after the controller determines that the set low/medium speed condition is not satisfied, the controller controls both of the exhaust bypass valve and the intake bypass valve in a manner so that the exhaust bypass valve and the intake bypass valve, respectively, are not closed, and wherein the set low/medium speed condition is satisfied when a current detected rpm of the engine is smaller than a predetermined maximum turbocharger operated engine rpm.

2. The method of claim 1, wherein the determining whether the acceleration request condition is satisfied, is performed by the controller based on a vehicle operating condition including a request air volume, a request torque, or a request boost pressure.

3. The method of claim 2, wherein:
if the request air volume is selected,
the request air volume is an air volume requested by the engine, which is calculated from a detected accelerator opening angle, and
when the request air volume is larger than an actual air volume supplied to the engine, the acceleration request condition is satisfied.

4. The method of claim 2, wherein:
if the request torque is selected,
the request torque is request torque calculated from a detected accelerator opening angle, and
when the request torque is larger than a set maximum natural intake engine torque of engine, the acceleration request condition is satisfied.

5. The method of claim 2, wherein:
if the request boost pressure is selected,
the request boost pressure is request boost pressure calculated from a detected accelerator opening angle, and
when the request boost pressure is larger than a set maximum natural intake boost pressure of the engine, the acceleration request condition is satisfied.

6. The method of claim 1, wherein the opening angle of the exhaust bypass valve is determined based on a vehicle operating condition including a request air volume, a request torque, and a request boost pressure.

7. The method of claim 1, wherein:
after the controlling of the opening angle of the exhaust bypass valve according to the acceleration request condition, the controller determines whether a current request torque is smaller than an engine torque and when the current request torque is smaller than the engine torque, the controller opens the exhaust bypass valve and the intake bypass valve.

8. The method of claim 7, wherein the controller determines whether the current request torque is smaller than the engine torque within a set time which is delayed after controlling the opening angle of the exhaust bypass valve.

9. The method of claim 1, further comprising:
before starting the engine, determining whether an ignition key sensor is on by the controller receiving a signal from the ignition key sensor;
before starting the engine, opening the intake bypass valve and the exhaust bypass valve fully when the ignition key sensor is not on;
before starting the engine, verifying positions of the intake and exhaust bypass valves by fully closing the intake and exhaust bypass valves and fully opening the intake and exhaust bypass valves thereafter, when the ignition key sensor is on; and
starting the engine.

* * * * *